Figure 1:
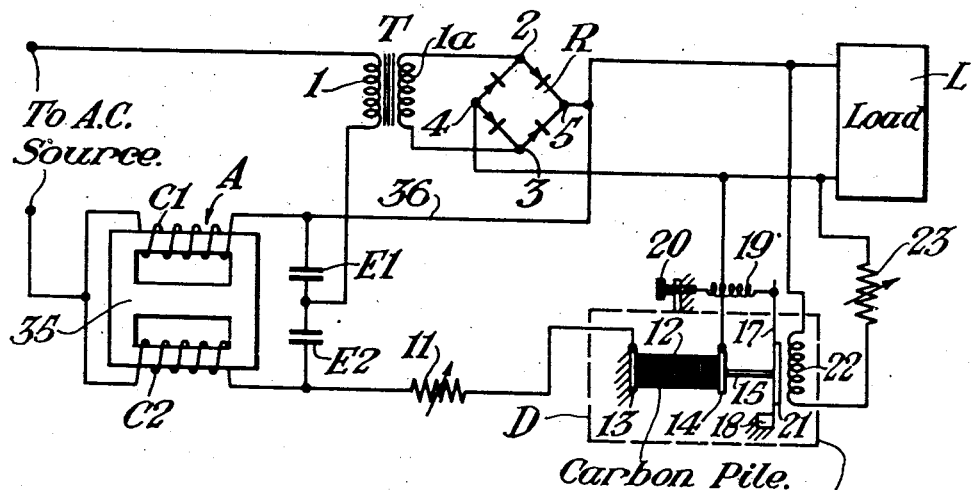

June 1, 1948.  A. H. B. WALKER  2,442,737
ELECTRICAL REGULATING APPARATUS
Filed Oct. 6, 1945

INVENTOR.
Alec Hervey Bennett Walker
BY
HIS ATTORNEY

Patented June 1, 1948

2,442,737

UNITED STATES PATENT OFFICE 2,442,737

ELECTRICAL REGULATING APPARATUS

Alec Hervey Bennett Walker, London, England, assignor, by mesne assignments, to The Union Switch and Signal Company, Swissvale, Pa., a corporation of Pennsylvania Application October 6, 1945, Serial No. 620,728
In Great Britain January 29, 1945

5 Claims. (Cl. 175—363)

My invention relates to electrical regulating apparatus, and particularly to apparatus for regulating the output voltage of a rectifier which supplies energy to a direct current load from a source of alternating current. More particularly, my present invention relates to regulating apparatus of the type described which will function automatically in response to small changes in the output voltage of the rectifier to maintain the output voltage of the rectifier substantially constant.

Various arrangements have previously been proposed for automatically varying the voltage at the output terminals of a rectifier in accordance with the load current, and one such arrangement is described in my prior Letters Patent of the United States No. 2,177,556. According to the teachings in this patent, an inductance or choke coil is connected in the alternating input circuit for the rectifier, and this choke coil is provided with a magnetic circuit the saturation of which is automatically varied to vary the inductance of the choke coil by means of a saturating winding connected across the terminals of the load circuit in such manner that the energization of this saturating winding varies in accordance with variations in the load current.

This arrangement is, however, open to the disadvantage that the automatic regulation in accordance with the voltage across the load circuit terminals is not sufficiently close to take account of the variations in frequency, temperature and other conditions encountered in practice, and according to the principal feature of my present invention, the necessary control of the alternating current is arranged to be effected by a regulating device adapted to provide a magnified control action in the event of any variation from the desired standard in the voltage across the load circuit terminals.

In carrying the invention into practice the regulating device may consist of a carbon pile regulator the mechanical pressure exerted on the resistance element of which is arranged to be electromagnetically varied in accordance with the load circuit voltage, the corresponding but magnified resistance variation of the element being arranged to vary the alternating current supplied to the rectifier in any desired manner, as, for example, by varying the current supplied to the saturating winding of a choke coil device connected in the alternating current circuit.

Alternatively, the regulating device may be constituted by a non-linear resistance capable of undergoing by thermal action or otherwise relatively large variations in resistance for relatively small variations in the load circuit voltage applied thereto.

Again, a regulating device of the well-known Tirell vibrating contact type may be employed.

A regulating device of any of the above or other suitable types may be arranged to vary the current traversing the saturating winding of a choke coil device as above explained, this current being derived from any suitable source such, for example, as a small auxiliary rectifier or the load circuit terminals.

In the specific embodiment of my invention illustrated herein, a regulating device of the type above referred to is arranged to control the magnetic saturation of the saturated transformers utilized in certain well-known apparatus for supplying unidirectional current at a substantially constant voltage through a rectifier to a load circuit, the applied voltage being thereby rendered more nearly constant regardless of frequency or other variations in the source of alternating current supply.

Other objects and characteristic features of my invention will become apparent as the description proceeds.

I shall describe one form of apparatus embodying my invention, and shall then point out the novel features thereof in claims.

Figure 2:
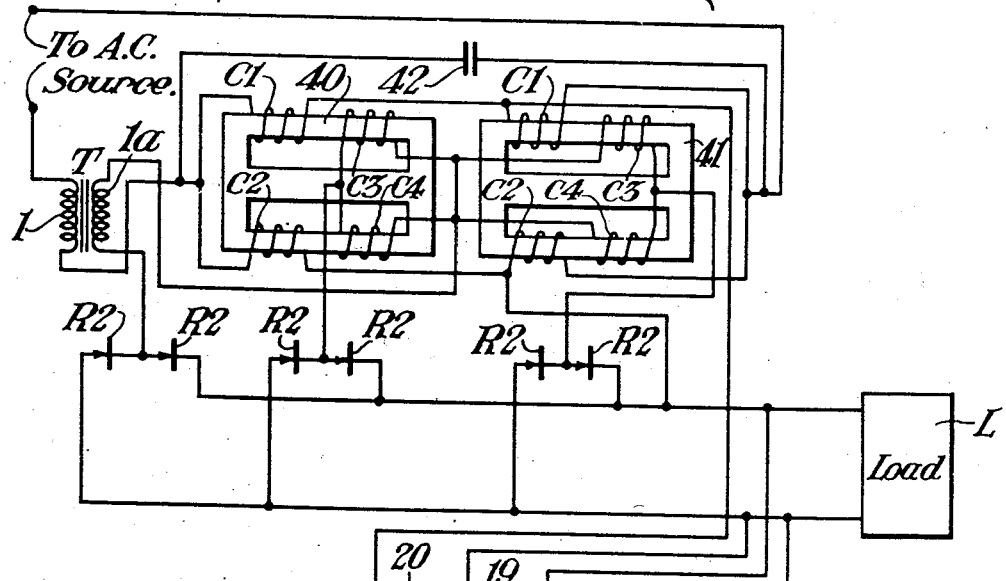

In the accompanying drawings, Fig. 1 is a diagrammatic view showing one form of regulating apparatus employed in connection with my invention, while Fig. 2 illustrates the specific embodiment of my invention.

Similar reference characters refer to similar parts in both views.

Referring first to Fig. 1, the reference character T designates a transformer, the primary winding 1 of which is supplied with alternating current from a suitable source, not shown in the drawing, in series with the parallel connected windings C1 and C2 of an inductance or regulating device A and the condensers $E_1$ and $E_2$, while the secondary winding 1a of transformer T is connected to the input terminals 2 and 3 of a full wave rectifier R of the well-known dry surface contact type, which rectifier, in turn, has its output terminals 4 and 5 connected with a variable direct current load L.

The regulating device A may take a variety of forms, but in the well-known form here shown this regulating device comprises a magnetizable core 35 having three parallel legs connected together at each end to form an integral core structure, upon the outer two legs of which are mounted respectively the coils C1 and C2 which are connected in parallel to form the alternating current winding of the regulating device. The coils C1 and C2 are also arranged to be energized in series by direct current the magnitude of which is varied in accordance with variations in the load current in a manner which I shall describe shortly. When direct current is supplied to coils C1 and C2 in series, the unidirectional flux set up by such current threads the middle leg through two parallel magnetic circuits one circuit of which comprises the middle leg and one outer leg and the adjoining end portions of the core 35, and the other magnetic circuit of which comprises the middle leg and the outer leg 9 and the adjoining end portions of the core. It will be readily apparent, therefore, that the unidirectional flux which is set up by the direct current is energized is effective to vary the reluctances of the outer legs of the core 35 and thereby control the impedance which the coils C1 and C2 present to the primary circuit of transformer T.

As shown in Fig. 1, the direct current supplied to the coils C1 and C2 of the regulating device A is controlled in accordance with the voltage across the load terminals by means of a voltage sensitive device D, whereby the load voltage is maintained constant irrespective of variations in the frequency of the supply source, changes in ambient temperature, aging of the rectifier, etc., as well as changes due to variations in the usual large ranges of the supply voltage and the load current. The voltage sensitive device may assume a variety of forms, such, for example, as a "thermistor," a vibrating contact device such as a Tirell regulator, or a non-linear resistance device of the "Metrosil" type. However, since the control is to be taken from the load terminals, and since the load voltage has a large "steady" term which must be "backed off" in order that the superimposed variations which are to be corrected for may operate the voltage sensitive device D, I prefer to employ a voltage sensitive device which is capable of providing the desired "backing off."

One form of device which is particularly suitable for this purpose is designated as a whole by the reference character D in the drawing, and comprises a carbon pile 12 disposed between a fixed end plate 13 and a movable end plate 14. The movable end plate 14 is connected by means of a rod 15 to a resilient support 17 secured at its lower end to a fixed support 18 and connected at its upper end to a spring 19 by means of which a fixed initial pressure may be exerted on the discs of the carbon pile. The spring at the end opposite to the support 17 is attached to an adjusting screw 20 which provides a convenient means for adjusting the spring pressure to the desired value. The device D also comprises an armature 21 which is attached to the support 17, and which cooperates with a winding 22 in such manner that when the winding 22 is energized, the resultant flux will attract the armature toward the winding with a force which varies with the degree of energization of the winding, and which force opposes that due to the spring 19. The winding 22 is connected across the output terminals 4 and 5 of the rectifier R in parallel with the load L, and in series with a variable resistance 23. The resistance 23 provides a means by which the degree of energization of the winding 22 for any desired output voltage can be readily varied.

With the regulating apparatus constructed in the manner described, it will be apparent that any increase in the resistance of the carbon pile 12 will decrease the direct current energization of the coils C1 and C2 and the saturation of core 35, and hence will increase the impedance of the coils C1 and C2 to alternating current, to decrease the input voltage of rectifier R and hence decrease the output voltage of the rectifier, whereas a decrease in the resistance of the carbon pile will produce an opposite effect. It will also be apparent that the resistance of the carbon pile, in turn, will depend upon the difference between the forces exerted on it by the spring 19 and the opposing force due to the energization of the winding 22, and that since the spring force is substantially constant while the energization of the winding 22 is proportional to the load voltage, the resistance of the carbon pile will increase or decrease according as the load voltage increases or decreases. It follows that by properly proportioning the parts, the voltage sensitive device can be made to so control the regulating device A as to compensate for changes in the load voltage regardless of the cause of the change. In this connection it should be particularly pointed out that the resistance 23 provides a convenient means for varying the energization of the winding 22 to provide the desired initial magnetic pull on the armature 21 for any desired output voltage, while the adjusting screw 20 provides a means for varying the pressure of the spring 19 to enable the spring pressure to offset the magnetic pull due to winding 22 to any desired extent to thereby provide the desired "backing off" effect referred to hereinbefore. It should also be noted that the device D when properly adjusted functions as an amplifier and thus provides a convenient means for maintaining a magnified control action which magnified control action renders the device extremely sensitive to changes in the load voltage regardless of the cause of the change.

Referring now to Fig. 2, I have here shown regulating apparatus embodying my invention applied to a rectification system of the general type described and claimed in Letters Patent of the United States No. 2,209,948, granted to H. M. Harmer on August 6, 1940, for Polyphase rectification from a single phase electricity supply. As illustrated in Fig. 4, the regulating apparatus comprises two transformers T and T1. The transformer T is similar to the correspondingly designated transformer in Fig. 1, and the transformer T1 is of the saturating type and corresponds to the regulating device A of Fig. 1. The transformer T1 as shown comprises two separate three-legged closed cores 40 and 41, each provided with a primary winding divided into two separate coils C1 and C2 disposed on the two outside legs of the core, and with a secondary winding which is likewise divided into two separate coils C3 and C4 disposed on the two outside legs of the core in inductive relation with the associated primary coils. The two primary coils C1 in series are connected in parallel with the two primary coils C2 in series and the series parallel arrangement of the primary coils thus formed is connected in series with the primary winding 1 of transformer T across a suitable source of single phase alternating current. A condenser 42 is connected in multiple with the series parallel arrangement of the primary coils of transformer T1 for the purpose of shifting the phase of the voltage of the transformer T with respect to that of the transformer T1, as described in detail in the said Harmer Patent No. 2,209,948. The secondary coils C3 and C4 on each core of the transformer T1 are connected in parallel, and the resulting parallel connections in series are connected by a Scott connection to the secondary winding 1a of transformer T to provide a three-phase output. The output terminals of the secondary windings are all connected to the load L through rectifier units R2 in such manner that three-phase full wave rectified current is supplied to the load. The portion of the apparatus thus far described is identical with that described and claimed in the above referred to Harmer patent, and as there pointed out the reactance of the transformer T is proportioned with respect to the reactance of the transformer T1 and condenser 42 so that the magnitudes of the secondary voltages will be equal at full load and will be angularly spaced from each other 120°. If the load decreases, the angular displacement and magnitude of the secondary voltages will change, and by proper proportioning of the parts relatively close regulation can be obtained.

In accordance with my present invention, I improve the voltage regulation of the apparatus just described by supplying direct current from the load circuit to the two primary windings C1 and C2 in series on each core over an energizing circuit which includes the carbon pile 12, whereby the saturation of the cores 40 and 41 and hence the output voltages of the device will be automatically controlled in accordance with variations in the resistance of the carbon pile. The resistance of the carbon pile varies automatically in accordance with variations in the load voltage in the manner described above in connection with Fig. 1 and the parts are so proportioned that the voltage regulation provided by the apparatus embodying my invention will supplement that inherently present in the circuit arrangement without the apparatus embodying my invention in a manner to provide a very constant output voltage irrespective of variations in frequency, temperature, input voltage, load current, etc.

It should be pointed out that with any of the regulating systems described above, additional compounding of the output is possible in order to provide a rising or falling output voltage with loads. To provide this effect, the load current, or a current proportional to the load current may be made to circulate through an additional winding provided on the regulating device, or this current may be circulated through the direct current windings of the regulating devices.

Although I have herein shown and described only one form of electrical regulating apparatus embodying my invention, it is understood that various changes and modifications may be made therein within the scope of the appended claims without departing from the spirit and scope of my invention.

Having thus described my invention, what I claim is:

1. In a rectifying arrangement comprising, in combination with rectifying means, transformers having reactance associated with them and having their primary windings connected in series and adapted for being connected across a source of single phase alternating current and having their secondary windings connected in parallel through rectifying means from which a load can be supplied with rectified current, and an oscillatory circuit in which a capacitive reactance device is connected in parallel with a winding of one transformer, the said circuit having external reactance which is so related to the reactance associated with the other transformer that at the normal loading of the arrangement the respective transformer voltages have a polyphase phase relationship, the combination with the aforementioned instrumentalities of a carbon pile, means including a winding energized in accordance with the rectifier output voltage for varying the pressure exerted on said carbon pile to cause its resistance to vary in accordance with variations in the load voltage, and means for varying the saturation of the one transformer comprising a circuit including a winding on the core of the transformer connected in series with a source of direct current and said carbon pile.

2. In combination, a first transformer having a primary and a secondary winding, a second transformer comprising two separate three-legged closed core reactors each having a primary winding comprising two coils disposed respectively on the two outside legs of the associated core and a secondary winding comprising two coils disposed respectively on the two outside legs of the associated core in inductive relation to the primary coils on the same core legs, a primary circuit including the one primary coil on the one leg of the one core in series with the one primary coil on the corresponding one leg of the other core connected in parallel with the other primary coil on the other leg of the one core in series with the other primary coil or the other leg of the other core and the series parallel combination thus formed connected in series with the primary winding of the first transformer, a condenser connected in multiple with the series parallel arrangement of the primary coils of said second transformer, the two secondary coils being connected in parallel, and the resulting parallel connections being connected to the secondary winding of said first transformer to provide a three-phase output, a load connected through rectifiers to said secondary windings of said transformers to provide three-phase rectified current, a carbon pile, means including a winding energized in accordance with the rectifier output voltage for varying the pressure exerted on said carbon pile to cause its resistance to vary in accordance with variations in the load voltage, and means for supplying to the two primary windings on each core in series direct current over a circuit which includes said carbon pile in series.

3. In an arrangement for supplying rectified current to a load circuit comprising a polyphase rectifier, with transformer means comprising a saturable main reactor core and a non-saturable auxiliary reactor core with windings thereon arranged to form primary and secondary circuits and having a condenser associated with the winding on said main reactor tending to tune said winding to resonance, whereby said secondary circuits are caused to supply polyphase voltages to the input terminals of said rectifier when the primary windings are energized from a single phase alternating current source, the combination of the foregoing with a control circuit for said main reactor in non-inductive relation to said alternating current circuits, means supplying direct current to said control circuit to govern the saturation of said main reactor core, and regulating means for varying said direct current in response to variations in the rectified voltage supplied to the load circuit by said rectifier.

4. In an arrangement for supplying rectified current to a load circuit comprising a polyphase rectifier, with transformer means comprising a saturable main reactor core and a non-saturable auxiliary reactor core with windings thereon arranged to form primary and secondary circuits and having a condenser associated with the winding on said main reactor tending to tune said winding to resonance, whereby said secondary circuits are caused to supply polyphase voltages to the input terminals of said rectifier when the primary windings are energized from a single phase alternating current source, the combination of the foregoing with a control circuit for said main reactor in non-inductive relation to said alternating current circuits, means supplying direct current to said control circuit to govern the saturation of said main reactor core, and regulating means for varying said direct current comprising an amplifier responsive to a relatively small change in the rectified voltage supplied to the load circuit and acting to vary said direct current in a direction tending to oppose such change.

5. In an arrangement for supplying rectified current to a load circuit comprising a polyphase rectifier, with transformer means comprising a saturable main reactor core and a non-saturable auxiliary reactor core with windings thereon arranged to form primary and secondary circuits and having a condenser associated with the winding on said main reactor tending to tune said winding to resonance, whereby said secondary circuits are caused to supply polyphase voltages to the input terminals of said rectifier when the primary windings are energized from a single phase alternating current source, the combination of the foregoing with a control circuit for said main reactor in non-inductive relation to said alternating current circuits, means supplying direct current to said control circuit to govern the saturation of said main reactor core, and regulating means for varying said direct current comprising an amplifier having an input element connected to the output terminals of said rectifier and an output element included in said control circuit.

ALEC HERVEY BENNETT WALKER.

REFERENCES CITED

The following references are of record in the file of this patent:

UNITED STATES PATENTS

| Number | Name | Date |
| --- | --- | --- |
| 1,485,076 | Haighton | Feb. 26, 1924 |
| 1,662,889 | Hubbard | Mar. 20, 1928 |
| 1,691,022 | Crouse et al. | Nov. 6, 1928 |
| 1,753,921 | Edelman | Apr. 8, 1930 |
| 2,066,943 | Philpott | Jan. 5, 1937 |
| 2,067,143 | Logan | Jan. 5, 1937 |
| 2,079,500 | Foos | May 5, 1937 |
| 2,331,131 | Moyer | Oct. 5, 1943 |